(12) United States Patent
Haitani et al.

(10) Patent No.: US 8,280,437 B2
(45) Date of Patent: *Oct. 2, 2012

(54) CONTACT-CENTRIC USER-INTERFACE FEATURES FOR COMPUTING DEVICES

(75) Inventors: Robert Haitani, Menlo Park, CA (US);
Srikiran Prasad, Cupertino, CA (US);
Nancy Gayed, San Francisco, CA (US);
Gregory Shirai, Oakland, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/330,996

(22) Filed: Dec. 20, 2011

(65) Prior Publication Data
US 2012/0094715 A1     Apr. 19, 2012

Related U.S. Application Data

(63) Continuation of application No. 12/692,581, filed on Jan. 22, 2010, now Pat. No. 8,099,129, which is a continuation of application No. 11/200,502, filed on Aug. 8, 2005, now Pat. No. 7,680,513.

(51) Int. Cl.
*H04M 1/00* (2006.01)
(52) U.S. Cl. ............... 455/556.2; 455/55.1; 455/557; 455/566; 455/412.2; 455/414.2; 455/404.2; 709/220; 709/227; 709/206; 379/266.1; 715/780; 715/816
(58) Field of Classification Search ............... 455/556.2, 455/412.2, 412.1, 414.2, 404.2, 556.1, 557, 455/566; 379/266.1; 709/206, 224, 227, 709/220
See application file for complete search history.

(56) References Cited

U.S. PATENT DOCUMENTS

| 5,895,461 | A  | 4/1999  | De La Huerga et al. |
| 6,005,928 | A  | 12/1999 | Johnson |
| 6,279,018 | B1 | 8/2001  | Kudrolli et al. |
| 6,360,272 | B1 | 3/2002  | Lincke et al. |
| 6,442,263 | B1 | 8/2002  | Beaton et al. |
| 6,516,202 | B1 | 2/2003  | Hawkins et al. |
| 6,593,944 | B1 | 7/2003  | Nicolas et al. |
| 6,608,637 | B1 | 8/2003  | Beaton et al. |
| 6,781,575 | B1 | 8/2004  | Hawkins et al. |
| 6,801,955 | B2 | 10/2004 | Dunlap et al. |
| 6,829,607 | B1 | 12/2004 | Tafoya et al. |

(Continued)

FOREIGN PATENT DOCUMENTS

EP     0611239 A1     8/1994

(Continued)

OTHER PUBLICATIONS

International Search Report and Written Opinion of Jul. 14, 2010 in International Application PCT/US2009/068317.

(Continued)

*Primary Examiner* — Marceau Milord

(57) ABSTRACT

Embodiments described herein provide a system, method and technique for operating a communication device. According to an embodiment, information contained in a contact record is displayed, where the information includes a plurality of entries. Each entry is associated with one of a plurality of communication types and includes an identifier for use with an application of the associated communication type. An input is detected corresponding to a user's selection of one of the plurality of entries. In response to the user's selection, the application of the communication type associated with the selected entry is automatically executed by initiating a communication using the identifier included in the selected entry.

15 Claims, 7 Drawing Sheets

U.S. PATENT DOCUMENTS

| | | | |
|---|---|---|---|
| 6,895,426 B1 | 5/2005 | Cortright et al. | |
| 6,928,305 B2 | 8/2005 | DeWald et al. | |
| 6,973,299 B2 | 12/2005 | Apfel | |
| 6,993,561 B2 | 1/2006 | Lincke et al. | |
| 7,007,239 B1 | 2/2006 | Hawkins et al. | |
| 7,013,130 B2 | 3/2006 | Ku | |
| 7,032,174 B2 | 4/2006 | Montero et al. | |
| 7,117,445 B2 | 10/2006 | Berger | |
| 7,124,370 B2 | 10/2006 | Fish | |
| 7,139,555 B2 * | 11/2006 | Apfel | 455/412.2 |
| 7,151,952 B2 | 12/2006 | Nakatsuchi et al. | |
| 7,171,236 B2 | 1/2007 | Heo | |
| 7,188,316 B2 | 3/2007 | Gusmorino et al. | |
| 7,190,975 B2 | 3/2007 | Rho | |
| 7,216,133 B2 | 5/2007 | Wu et al. | |
| 7,225,409 B1 | 5/2007 | Schnarel et al. | |
| 7,231,208 B2 | 6/2007 | Robertson et al. | |
| 7,231,229 B1 * | 6/2007 | Hawkins et al. | 455/564 |
| 7,233,813 B2 | 6/2007 | Kokubo | |
| 7,254,573 B2 | 8/2007 | Burke | |
| 7,266,586 B2 | 9/2007 | Lincke et al. | |
| 7,287,097 B1 | 10/2007 | Friend et al. | |
| 7,295,852 B1 | 11/2007 | Davis et al. | |
| 7,302,270 B1 | 11/2007 | Day | |
| 7,302,280 B2 | 11/2007 | Hinckley et al. | |
| 7,319,744 B1 | 1/2008 | Arnold et al. | |
| 7,325,032 B2 | 1/2008 | Zuberec et al. | |
| 7,376,846 B2 | 5/2008 | Hawkins et al. | |
| 7,418,663 B2 * | 8/2008 | Pettinati et al. | 715/739 |
| 7,430,719 B2 | 9/2008 | Pettinati et al. | |
| 7,447,799 B2 | 11/2008 | Kushner | |
| 7,474,298 B2 | 1/2009 | Nguyen et al. | |
| 7,477,908 B2 | 1/2009 | Klassen et al. | |
| 7,502,849 B2 | 3/2009 | Roberts et al. | |
| 7,522,536 B2 | 4/2009 | Roberts et al. | |
| 7,522,913 B2 | 4/2009 | Kraft | |
| 7,543,243 B2 | 6/2009 | Schwartz et al. | |
| 7,587,502 B2 | 9/2009 | Crawford et al. | |
| 7,680,513 B2 * | 3/2010 | Haitani et al. | 455/556.2 |
| 7,730,134 B2 | 6/2010 | Blagsvedt et al. | |
| 7,747,690 B2 | 6/2010 | Kraenzel et al. | |
| 7,783,614 B2 | 8/2010 | Jones et al. | |
| 7,827,546 B1 | 11/2010 | Jones et al. | |
| 7,929,946 B2 * | 4/2011 | Rathus et al. | 455/411 |
| 8,065,369 B2 * | 11/2011 | Turski et al. | 709/206 |
| 8,099,129 B2 * | 1/2012 | Haitani et al. | 455/556.2 |
| 2001/0042100 A1 | 11/2001 | Guedalia et al. | |
| 2002/0067714 A1 | 6/2002 | Crain et al. | |
| 2002/0118396 A1 | 8/2002 | Kawai | |
| 2002/0187794 A1 | 12/2002 | Fostick et al. | |
| 2003/0046256 A1 | 3/2003 | Hugosson et al. | |
| 2003/0210260 A1 | 11/2003 | Palmer et al. | |
| 2004/0024846 A1 | 2/2004 | Randall et al. | |
| 2005/0131992 A1 | 6/2005 | Goldstein et al. | |
| 2005/0188312 A1 | 8/2005 | Bocking et al. | |
| 2005/0198144 A1 | 9/2005 | Kraenzel et al. | |
| 2006/0015819 A1 * | 1/2006 | Hawkins et al. | 715/780 |
| 2006/0020615 A1 | 1/2006 | Keohane et al. | |
| 2006/0026521 A1 * | 2/2006 | Hotelling et al. | 715/702 |
| 2006/0035632 A1 * | 2/2006 | Sorvari et al. | 455/418 |
| 2006/0129929 A1 | 6/2006 | Weber et al. | |
| 2006/0242109 A1 | 10/2006 | Pereira et al. | |
| 2006/0264205 A1 * | 11/2006 | Gibbs | 455/413 |
| 2006/0281449 A1 * | 12/2006 | Kun et al. | 455/418 |
| 2006/0288297 A1 | 12/2006 | Haitani et al. | |
| 2006/0288298 A1 | 12/2006 | Haitani et al. | |
| 2007/0032267 A1 | 2/2007 | Haitani et al. | |
| 2007/0036286 A1 | 2/2007 | Champlin et al. | |
| 2007/0049335 A1 | 3/2007 | Haitani et al. | |
| 2010/0131467 A1 | 5/2010 | Prahlad et al. | |
| 2010/0167766 A1 | 7/2010 | Duarte et al. | |

FOREIGN PATENT DOCUMENTS

| | | |
|---|---|---|
| EP | 1503604 A2 | 2/2005 |
| KR | 10-0474439 | 3/2005 |
| KR | 10-2007-65688 | 6/2007 |
| WO | WO 98/048550 A1 | 10/1998 |
| WO | WO 99/026127 A1 | 5/1999 |
| WO | WO 01/50680 A2 | 7/2001 |
| WO | WO 2004/104789 A2 | 12/2004 |
| WO | WO 2005/111849 A2 | 11/2005 |
| WO | WO 2006-108705 | 10/2006 |

OTHER PUBLICATIONS

Notice of Allowance mailed Jan. 11, 2010 in U.S. Appl. No. 11/200,502.

Final Office Action mailed Mar. 2, 2011 in U.S. Appl. No. 11/434,504, 16 pages.

Final Office Action mailed Nov. 22, 2010 in U.S. Appl. No. 11/434,504, 34 pages.

Annex to Form PCT/ISA/206 Communication Relating to the Results of the Partial International Search in International Application PCT/US2006/030826, Dec. 6, 2006, 4 pages.

Final Office Action mailed Aug. 13, 2009 in U.S. Appl. No. 11/434,502, 29 pages.

Final Office Action mailed Jan. 13, 2010 in U.S. Appl. No. 11/434,504, 16 pages.

Final Office Action mailed Dec. 16, 2008 in U.S. Appl. No. 11/200,510.

Getting Started With Your PowerBook G4, pp. 1, 2, and 34, Copyright © 2002, Apple Computer, Inc., Cupertino, CA.

International Search Report and Written Opinion of the International Searching Authority in International Application PCT/US2006/030827, European Patent Office, Jan. 15, 2007, 15 pages.

International Search Report and Written Opinion of the International Searching Authority in International Application PCT/US2006/030979, European Patent Office, Jul. 17, 2007, 11 pages.

International Search Report and Written Opinion of the International Searching Authority in International Application PCT/US2006/030826, European Patent Office, Jan. 23, 2007, 21 pages.

Internet Telephony Manager (ITM) User Guide, XP002413107, Dec. 1, 1996, pp. 1-5.

Leih, A. Z., "Windows Mobile 5.0: Exposed!," Mar. 24, 2005, www.pocketnow.com/index.php?a=portal_detail&t=reviews&id=601.

Nokia 6630 User's Guide, XP002413106, Mar. 28, 2005, pp. 1-109.

Non-Final Office Action mailed Jun. 23, 2008 in U.S. Appl. No. 11/200,510.

Non-Final Office Action mailed Feb. 27, 2009 in U.S. Appl. No. 11/200,511, 7 pages.

Non-Final Office Action mailed Feb. 18, 2009 in U.S. Appl. No. 11/200,502.

Non-Final Office Action mailed Feb. 18, 2009 in U.S. Appl. No. 11/434,502.

Non-Final Office Action mailed May 12, 2010 in U.S. Appl. No. 11/434,502, 31 pages.

Non-Final Office Action mailed Aug. 18, 2010 in U.S. Appl. No. 11/434,504, 14 pages.

Non-Final Office Action mailed Aug. 19, 2009 in U.S. Appl. No. 11/200,502, 32 pages.

PCT International Search Report and Written Opinion of the International Searching Authority in International Application PCT/US07/68906 Oct. 3, 2008, 17 pgs.

Sharma, A.K., Juneja, D., and Bishnoi, C., Intelligent Agents in Call Management System, Integration of Knowledge Intensive Multi-Agent Systems International Conference, XP010793134, Apr. 18, 2005, pp. 9-14.

Office Action mailed Sep. 15, 2010, issued in U.S. Appl. No. 12/692,581, filed Jan. 22, 2010.

Office Action mailed Apr. 5, 2011, issued in U.S. Appl. No. 12/692,581, filed Jan. 22, 2010.

Notice of Allowance mailed Oct. 13, 2011, issued in U.S. Appl. No. 12/692,581, filed Jan. 22, 2010.

* cited by examiner

US 8,280,437 B2

CONTACT-CENTRIC USER-INTERFACE FEATURES FOR COMPUTING DEVICES

RELATED APPLICATION

This application is a continuation of U.S. patent application Ser. No. 12/692,581, filed Jan. 22, 2010, now U.S. Pat. No. 8,099,129 which is a continuation of U.S. patent application Ser. No. 11/200,502, filed Aug. 8, 2005 (now U.S. Pat. No. 7,680,513), each of which are hereby incorporated by reference in their entireties for all purposes.

TECHNICAL FIELD

The disclosed embodiments relate generally to the field of user-interface features for computing devices, and more particularly, to contact-centric user-interface features for facilitating communications generated from a communication device.

BACKGROUND

Computing devices, particularly handheld and portable devices, have evolved to include numerous types of communication capabilities and functionality. For example, handheld devices exist that operate as cellular phones, messaging terminals, Internet devices, while including personal information management (PIM) software and photo-management applications. Additionally, Internet Protocol services exist that can transform Internet-enabled machines into telephony devices. Even stand-alone telephones that connect to traditional Public Switched Telephone Networks (PSTN) are including more software to enhance the telephone's functionality.

In enhancing telephony operations with computing resources and software, effort has been made to enhance and assist the user in using such devices. For example, software features exist to facilitate the ease in which the user can establish a speed dial, and to make recently used phone numbers more readily available to users. Small form-factor computing devices, such as devices that provide cellular phone functionality, have particular use for speed dial features, in order to reduce the manual involvement of the user. These devices have smaller keyboards that may be harder to operate, and/or use in mobile or dynamic environments, where the user cannot readily retrieve a desired number.

Telephony devices are just one type of communication device. There are now many types of communication types, and multi-functional devices exist to accommodate the different communication types. Examples of communication types other than telephony include e-mail, instant message (including SMS protocol messages and Multimedia Message Service (MMS) protocol messages), and video conferencing. Many computing devices, particularly smart phones, are enabled to support communications using multiple communication mediums.

DETAILED DESCRIPTION

Figure 1:
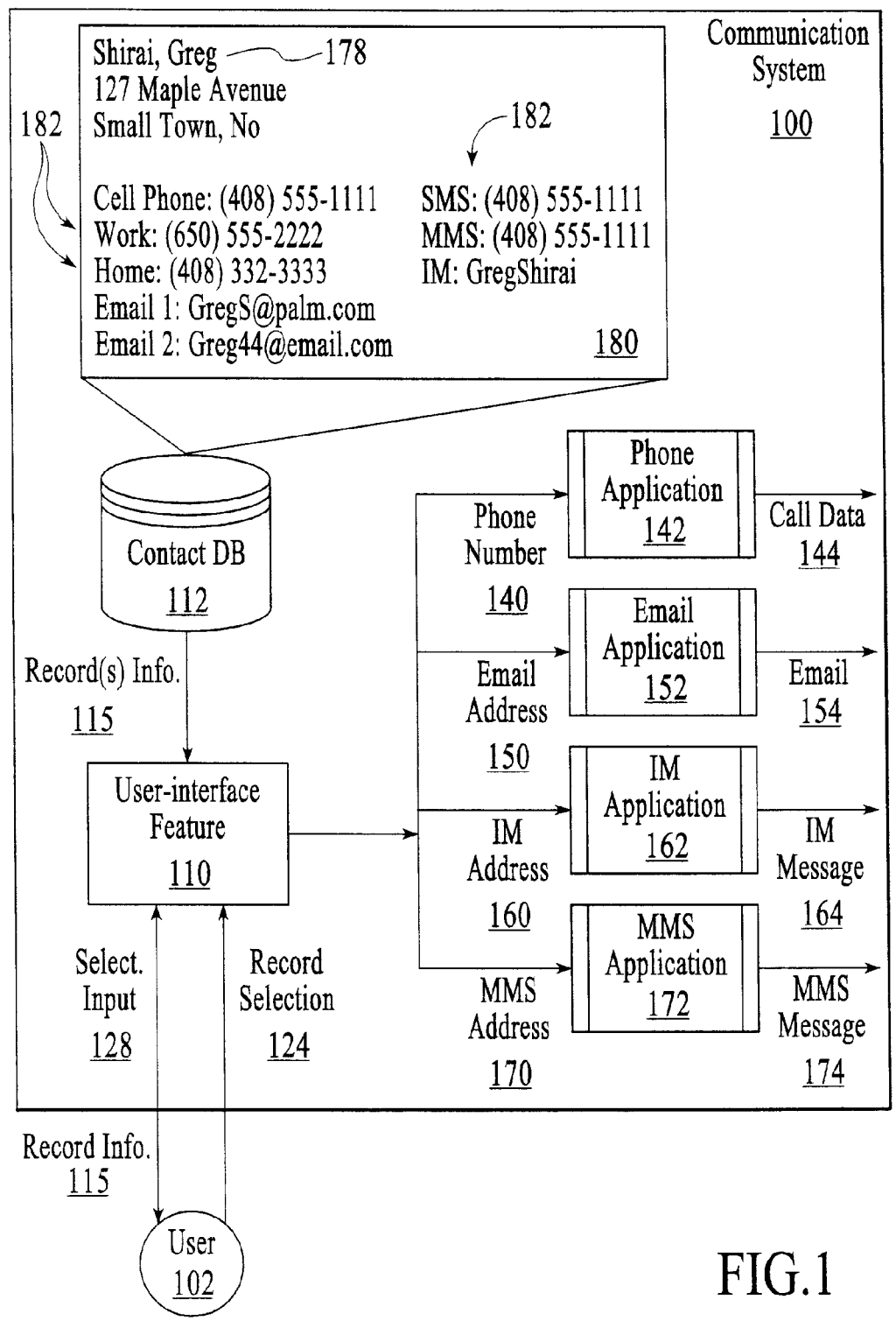
FIG. 1 illustrates a communication system that provides contact-centric user-interface features for exchanging different types of communications with correspondents, according to an embodiment.

Embodiments of the invention provide a contact-centric approach to user-interface features of computing devices for purpose of generating communications to desired correspondents. In particular, embodiments of the invention include user-interface features that make available abundant information that is based on the contents of contact records, in the context of enabling a user to communicate with the contacts. This information may include a listing of alternative phone numbers, email addresses, instant message identifiers or other communication identifiers, so that the user can choose from alternative phone numbers or from alternative modes of communication. The information may also include an image stored with the contact record, so that the user can visualize the contact and have a more personable experience using the communication device.

To provide an example, while many small form-factor devices such as cellular phones and wireless messaging phone hybrids (sometimes called smart phones), employ a redial list that displays a name of a contact and a number recently dialed, an embodiment of the invention provides that the redial list makes the contact record, or information from it, available. Thus, one embodiment provides that the user can use the redial list to view, for example, alternative phone numbers, email addresses, instant message identifiers, and/or an image of the contact record. All such information in the contact record may be made available through one selection action from the user, enabling the user to view the information from the contact record, prior to making a selection of a communication identifier or even a mode of communication.

As another example, speed dialing is a common feature on many cell phones and smart phones. One button press, for example, may direct a phone to place a call. Embodiments described herein expand this concept, to enable the user to specify different communication identifiers and types of communications (e.g. email) for one speed dial, or to view information such as images of the contact record, or alternative phone numbers and messaging addresses of the contact record.

Computing devices, such as smart phones, may associate numerous features and activities with contact records. For example, notification messages may be generated for the user of the communication device in response to activities that pertain to a contact. Rather than focusing on just the name of the contact, or the phone number or address involved in the communication activity, embodiments described herein focus on linking portions of contact records to features such as notifications or communication schemes (e.g., e-mail, telephone, SMS) that pertain to certain contact records.

Introduction

Embodiments described herein provide a system, method and technique for operating a communication device. According to an embodiment, information contained in a contact record is displayed, where the information includes a plurality of entries. Each entry is associated with one of a plurality of communication types and includes an identifier for use with an application of the associated communication type. An input is detected corresponding to a user's selection of one of the plurality of entries. In response to the user's selection, the application of the communication type associated with the selected entry is automatically executed by initiating a communication using the identifier included in the selected entry.

In an embodiment, a communication device may be operated to detecting an activity on the communication device that is associated with a contact record stored on the communication device. An action may be performed by the user, and in response, information is displayed to the user based on a content of the contact record. The information may include a plurality of entries that identify or correspond to one or more communication identifiers contained in the contact record. In an embodiment, each entry is selectable by the user to initiate a communication of a particular type. As a result, the plurality of entries combined enable the user to initiate a communication of more than one type. An input may be detected that corresponds to a selection by the user of one of the plurality of entries. In response to the selection, a communication may be automatically initiated using the communication identifier that corresponds to the entry of the selection. This communication may be of the type reflected by the entry.

One or more embodiments described herein may also be implemented in the context of a lookup feature. A lookup feature may enable the user to enter alphanumeric strings that are then matched to one or more fields of a contact in a contact database. Results from the user's input may provide information from one or more matching contact records. This information may include communication identifiers, that can be selected to initiate a communication method (e.g., telephone call, e-mail message, text message via SMS) with a correspondent of the contact record.

According to another embodiment, a communication device may be operated to associate a contact record with a shortcut action. The communication device may detect the shortcut action, and responsively display information from the contact record. The information may include one or more communication identifiers for use in generating communications of two or more types from the computer telephony device.

In another embodiment, an image is associated with the shortcut action. The image may be linked or stored with the contact record, or it may be linked only to the shortcut action. The image may then be displayed as a prompt to cause the user to select the shortcut action. For example, the image may be in the form of a selectable icon.

A communication corresponds to data representing any user-created message and/or utterance. Examples include text messages, multimedia messages and voice transmissions, including any data or voice transmission made during a phone call or other voice-exchange session.

Numerous types of computing devices may be employed with embodiments of the invention. One type of communication device that can be used in implementing embodiments described herein is a wireless, mobile computing device, sometimes called a "smart phone". Such devices are generally small to fit in one hand, and provide cellular telephony features in combination with other applications, such as contact applications for managing contact records, calendar applications for managing and scheduling events, task applications for keeping lists, and camera applications for capturing images. Another type of communication device that can be used to implement embodiments of the invention is a desktop computer that is configured to include real-time voice data exchange (e.g. through the use of a Voice over Internet Protocol). Still further, other types of communication devices exist, including standalone devices that connect directly to a telephone network (whether Internet Protocol or Public Switch Telephony System) and provide software interfaces and applications. Protocol or Public Switch Telephony System) and provide software interfaces and applications.

In an embodiment, a communication device is one that enables voice-exchange sessions. A voice-exchange includes any data transfer method in which a user's speech or utterance is transmitted across a network to the location of another device or user in real-time (e.g. instantaneous) or near real-time (e.g. less than three seconds). Examples of voice-exchange includes standard telephony calls, push-to-talk communications, or walkie-talkie radio communications. Another example of voice-exchange is when a voice transmission is recorded and transmitted as an instant message or file to be received and played back at the recipient. An example of such a service is provided with SKYPE, provided by the SKYPE GROUP. Voice exchange communications may be conducted over cellular networks, the Internet, Public Switch Telephony networks, local area networks and other networks. Specific examples of voice-exchange communications contemplated under one or more embodiments of the invention include (i) cellular communications, or (ii) voice communications conducted over Internet Telephony systems (e.g. through Voice over Internet Protocol). With the latter case, it should be noted that such communications may be conducted as wireless communications on a computing device, using a local wireless connection such as WiFi or Bluetooth (even though the voice-communication is transmitted over the Internet).

A communication device may employ different applications to enable communications of different types. For example, a communication device may include a phone application and one or more messaging applications. A phone application is any application that handles voice data in connection with voice-exchange session. A phone application may correspond to any component, module, or software that enables two-way telephony sessions, walkie-talkie radio transmissions, and instant-voice transfers. Messaging applications may be in the form of emails and instant messages. While many messaging applications are text-based, message formats such as Multimedia Messaging Service (MMS) are image or media based.

According to another embodiment, a contact record is associated with a shortcut action that can be performed by the user. When the user performs the shortcut action, information is displayed for communicating with the contact using any one of several communication types. In one embodiment, information displayed includes one or more identifiers for use in generating communications of two or more types from the computer telephony device.

As used herein, the term "user-interface feature" means a programmatic or logical mechanism that performs a specific operation or set of operations in response to a designated user-activity. One type of user-interface feature is a graphical user-interface feature. An example of a graphical-user interface feature is an icon, a menu item, entry or other data structure that serve to prompt the user to perform a stated action (e.g. perform a "click" action). Another example of a user-interface feature is a "shortcut action", which is a designated user-action or series of actions that (i) cause one or more operations to be performed by a computing device, and (ii) serve as a substitution or alternative for an equivalent user-activity that is longer in duration and/or more involved for the user (e.g. requires more user-interaction). For example, a shortcut action may correspond to a press and hold button or icon selection that results in a phone number being dialed. The short cut action substitutes for user-activity that would require locating the phone number and inputting each of the individual numbers.

A communication identifier is any alphanumeric data element that identifies a device and/or a location available for communications through a network (including, for example, cellular networks, the Internet, local area networks, and Public Switch Telephony Networks). Phone numbers, email addresses, instant message identifiers or even Internet Protocol addresses (e.g. as used for voice or data transmissions to or from a computing device) are examples of communication identifiers contemplated by embodiments of the invention. Numerous other examples are provided below.

Embodiments provide that methods, techniques and actions performed by the communication device are performed programmatically, or as a computer-implemented method. Programmatically means through the use of code, or computer-executable instructions. A programmatically performed step may or may not be automatic.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor (s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Overview

FIG. 1 illustrates a communication system that provides contact-centric user-interface features for exchanging different types of communications with correspondents, according to an embodiment. A communication system 100 includes a user-interface feature 110 and a contact database 112 (or other data structure form). As described throughout this application, the user-interface features 110 may have various forms and implementations, such as implementation as a graphic user-interface feature (e.g. "list") or as an event-driven programmatic element (e.g. "shortcut action"). According to an embodiment, the communication system 100 is capable of exchanging communications of different types with correspondents through use of different communication applications. In an embodiment such as shown by FIG. 1, the communication system 100 includes one or more of the following communication applications: a phone application 142 for engaging in telephonic sessions and generating call/voice data 144, an e-mail application 152 for generating e-mails 154, an instant message application 162 (e.g. a Short Message Service (SMS) application) for generating instant text messages 164, and an alternative multimedia instant message application 172 (e.g. Multimedia Message Service (MMS) application) for generating, for example, multimedia instant messages 174. The call/voice data 144, e-mails 154, instant text messages 164, and instant multimedia messages 174 are examples of different types of communications, as the data carried by each type of communication either represents a different kind of communication (e.g. telephonic, text, multimedia) or is handled and experienced differently by the recipient of the communications (e.g. instant text message versus e-mail). Different communication applications are assumed to generate different types of communications, unless stated otherwise.

As will be described in greater detail, each of the user-interface features 110 may provide one or more of the following functionality: (i) display communication identifiers, or data representing communication identifiers, from contact records stored in the contact database 112, and/or (ii) enable user-action that is specific to displayed or indicated communication identifiers and that can be correlated to initiation of a communication of a particular type using the displayed or indicated communication identifier.

Furthermore, one or more of the user-interface features 110 may correlate a contact record with a communication activity. The communication activity may include, for example, a communication attempted or initiated for a correspondent, a communication transmitted to the correspondent, or a communication received by the correspondent. For example, the user-interface features 110 may include lists or messages that record the occurrence of incoming or outgoing communications. The type of communication that is recorded may be one of design choice or implementation. For example, a communication log may maintain a list of all phone calls made or received, or it may contain a list of all messages and phone calls received or sent.

In an embodiment, one or more of the user-interface features 110 may include shortcut actions or programmatic triggers that are actionable by the user 102 to trigger display and/or use a designated communication identifier from a corresponding record. Such implementations may be done independently of correlating contact records with communication activities. Specific examples of user-interface features 110 are provided below.

Communication device 100 may correspond to any one of numerous types of computing devices, capable of sending and receiving communications of different types. In one embodiment, communication device 100 includes the capability to enable telephony, or at least voice-exchange sessions (such as provided by services such as SKYPE). In one implementation, communication device 100 corresponds to a wireless computing device having capabilities to enable voice calls and message exchanges over cellular networks. In another implementation, communication device 100 corresponds to a computer (such as a desktop computer) with capabilities to enable Voice Over Internet Protocol telephony sessions, as well as data message exchanges. Embodiments such as described by FIG. 1 and elsewhere in this application may be implemented on virtually any type of network enabled device capable of exchanging communications using different communication mediums or applications.

In FIG. 1, contact database 112 stores a plurality of contact records. Each contact record may store information about a correspondent (which may be a person or entity), including information for contacting and communicating with the correspondent. Information for contacting and communicating with the correspondent may include communication identifiers, which are data elements for identifying and locating a correspondent on a network, using a particular kind of protocol or transmission. Examples of communication identifiers include phone numbers, email addresses, and instant message identifiers. FIG. 1 shows an example of a contact record 180 that may be stored in the contact database 112. The contact record 180 includes a correspondent name 178 ("Greg Shirai") and numerous entries that contain information for exchanging communications of different types with the correspondent. In one implementation, each identifier item 182 includes a field that identifies the communication type, and a value that specifies an alphanumeric string that serves as a communication identifier for the particular type of communication. Each of the fields may be part of a template, although an embodiment provides that some or all of the fields may be defined by the user. For telephonic communications, contact record 180 may lists a mobile telephone number, a work telephone number, and a home telephone number as telephonic identifiers. For e-mail messaging, a primary e-mail address and a secondary e-mail address are e-mail identifiers. Additionally, the example shown includes three different forms of instant messages: an SMS identifier, a MMS identifier, and an Instant Message identifier.

Each contact record may also have a record identifier that identifies the contact record to the user. In one implementation, the record identifier may correspond to or be derived from the correspondent name 178. For example, the record identifier may correspond to "Greg Shirai" or "Greg" or "Greg S." Additionally, the contact record 180 may include information other than communication identifiers. For example, contact record 180 may include a mailing address, and personal information about the correspondent (e.g. Birthday). As described elsewhere in the application, the contact record 180 may also include an image.

User-interface feature 110 may, in response to user-input, display or present record information 115 of a given contact record stored in the contact database 112. The record information 115 may include identification or representation of a set of one or more communication identifiers contained in the given contact record. The record information 115 may be generated from the contents of the contact record 180. The communication identifiers provided in the record information 115 may represent some or all of the fields and/or field values contained in the given contact record. For example, the record information 115 may include a communication identifier for (i) telephonic communications (e.g. mobile phone number), (ii) e-mail messaging (e.g. primary e-mail address), and (iii) instant messaging (e.g. SMS identifier). The communication identifiers may be displayed with the corresponding fields and/or with the values provided in those fields. Alternatively, the record information 115 may represent the communication identifiers of the given record without actually displaying the communication identifiers. For example, the record information may contain "Greg's Mobile Number" and omit the actual number. Nevertheless, the representation is tied to a corresponding communication identifier from the given record.

In one implementation, the record information 115 may include all of the communication identifiers contained in the given contact record 180. In another implementation, only some of the communication identifiers of the contact record 180 are provided with the record information 115.

One or more of the user-interface features 110 may present and make record information 115 available in response to user-input. In an embodiment, user-interface feature 110 provides a mechanism (i) to display communication identifiers from individual contact records to user 102, and/or (ii) to enable the user 102 to enter selection input 128 that specifies a communication identifier. In one embodiment, the selection input 128 may also specify a type of communication that uses the communication identifier. The mechanism provided by the user-interface feature 110 may provide a mechanism to programmatically initiate a communication of a particular type in response to the selection input 128.

The user-interface features 110 may be provided in different contexts and uses. An embodiment provides that one of the user-interfaces 110 displays information that correlates communication activities with contact records, at least to the extent communication identifiers used with the communication activities are contained in corresponding contact records. Thus, record information 115 from the record 180 may be provided in the context of information that records a particular activity performed or handled by one of the communication applications in connection with a correspondent for that contact record. For example, one of the user-interface features 110 may be in the form of a list that logs communications made, received, or attempted through use of one or more of the communication applications. Entries in the list may identify correspondents of the logged communications by the contact record identifier, rather than by the communication identifier that may have been used by the user 102, or by the correspondent when the communication activity occurred. Individual entries in the list may be selectable by the user 102. In one embodiment, the user-interface 110 may provide a presentation comprising multiple contact record identifiers, and the user may enter a record selection 124 to view record information 115 from the selected contact record. Examples of how the communication identifiers may be viewed or used from a list are shown with FIG. 4A and FIG. 4B.

The user-interface features 110 may also enable the user 102 to act on the communication identifiers displayed or otherwise provided in the record information 115. For example, the record information 115 may contain selectable data elements that represent the communication identifiers of the contact record. The user may enter a selection input 128, which causes a corresponding one of the communication applications to initiate a communication using the selected communication identifier. In one embodiment, the communication may be initiated automatically, or substantially automatically (e.g. prompt the user to confirm first) in response to the selection input 128.

To provide an example of an embodiment described above, one of the user-interfaces 110 may display entries corresponding to individual contact records. The record selection 124 is for one of the displayed entries. In response to the record selection 124, the user-interface 110 displays record information 115, containing a display of multiple phone numbers and e-mail addresses (or representations of those phone numbers and e-email addresses). The selection input 128 may correspond to the user selecting a phone number from a phone number field, in which case the phone application 142 initiates a phone call using the phone number. Alternatively, the selection input 128 may correspond to a user selecting an email address from an email field (which may also be the phone number), resulting in a message being opened and addressed to the email address identified by the selection input 128.

Under another embodiment, one or more of the user-interface features 110 may correspond to a mechanism that allows the user to initiate a communication of a particular type, independent of previous communication activities or information recording occurrences of such activities. In one embodiment, the user-interface feature 110 is in the form of a programmatic mechanism that can be triggered by a designated input at any time. When triggered, an embodiment provides that communication identifiers from a given contact record associated with the user-interface feature 110 are displayed, and the user can take further action to select one of the communication identifiers for purpose of initiating communications of a particular type with the correspondent. Another embodiment may provide that one of the communication identifiers from the given contact record is used to automatically initiate a communication of a particular type, in response to the programmatic mechanism being triggered. Such embodiments are described below with FIG. 7.

In one embodiment, some or all of the one or more user-interface features 110 are provided as part of a user-interface application or operating system. Thus, for example, user-interface feature 110 may be provided by an application or process that is independent of the communication applications. In another embodiment, however, some or all of the user-interface features 110 may be provided as part of one or more of the communication applications. For example, the phone application 142 may operate and maintain one or more of the user-interface features 110.

Regardless of how the user-interface features 110 are provided, an embodiment provides that one or more of the user-interface features can be used to initiate communications of different types. Thus, for example, the phone application 142 may be used to view a list, but from the list, the user 102 may cause another application to execute and initiate a communication of a type other than a telephonic message. For example, selection input 128 may be for an email address in the record information 115, causing the email application 152 to execute from a user-interface feature of the phone application 142. Thus, one or more of the user-interface features 110 may be provided as part of one of the communication applications, while also serving as a mechanism for a user to launch another one of the communication applications.

Another embodiment provides that certain user-interface features may be used to display or represent multiple communication identifiers, of either the same or different types. Thus, multiple phone numbers may be displayed and/or made usable to a user-interface feature where with past approaches, single communication identifiers were provided with the same user-interface feature, independently of the contact records that contained those communication identifiers.

In the case where the user 102 enters selection input 128 that identifies a communication identifier in the record information 115, different variations are possible in the manner that the selection designates a communication type. Some communication identifiers may serve as identifiers for more than one type of communication application. For example, mobile phone numbers may be used by the phone application 142, the e-mail application 152, and one or more of the instant message applications 162, 172. In one embodiment, the selection input 128 is of the record item containing the communication identifier, as displayed with the corresponding field. Thus, the selection input 128 may indicate the type of communication that is to be initiated based on the field that contains the selected communication identifier. Alternatively, the communication identifier may be specified by the selection input 128, and when applicable, some other action or input may select the type of communication that is to be initiated using that identifier. The selection input 128 causes the appropriate communication application that generates the indicated communication type to use the selected contact identifier 128 to initiate a communication. It is also possible for the communication application that is used to go beyond initiating the communication and to transmit the communication of the indicated type.

To provide an illustrative example, the selected communication identifier is provided as the phone number 140, the phone application 142 uses the phone number to generate call data 144. The call data 144 may correspond to the initiation of a phone call or other voice-exchange session. However, the communication identifier that serves as the phone number 140 (e.g. mobile number) may alternate as an email address, instant message address, or portions thereof. In one implementation, the record information 115 may provide or associate the displayed communication identifiers with their corresponding fields from the contact record 180 in order to provide a mechanism by which the user can specify the communication type.

If the communication identifier of the selection input 128 corresponds to an email address 150, the email application 152 may be used to compose or otherwise generate the email 154, using the email address identified by the selection input. Likewise, if the selected communication identifier corresponds to an instant message communication, the corresponding or designated instant message application 162, 172 may be executed using the instant message identifier 164, 174 corresponding to that communication identifier.

Hardware Diagram

Figure 2A:
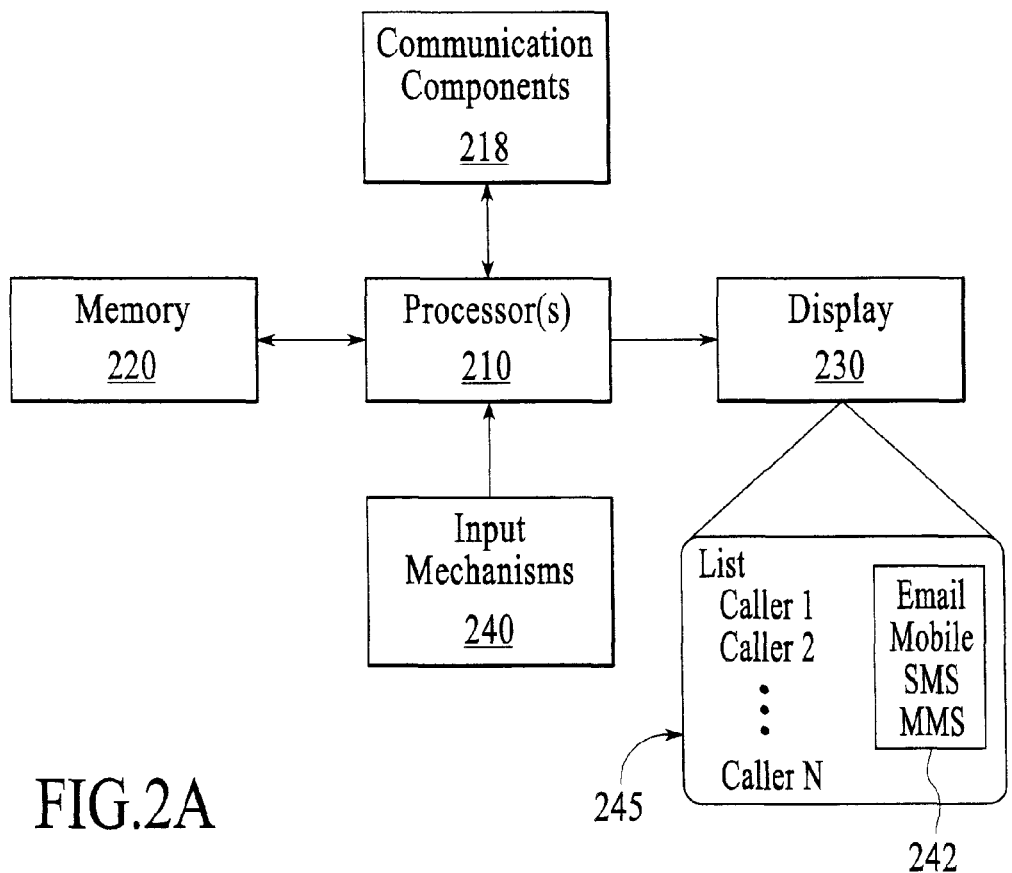
FIG. 2A illustrates a simplified hardware diagram for implementing a communication device such as described by FIG. 1, under an embodiment of the invention.

FIG. 2A illustrates a simplified hardware diagram for implementing a communication device such as described by FIG. 1, under an embodiment of the invention. In an embodiment, communication device 100 includes one or more of each of a processor 210, a memory device 220, and a display 230. The memory device 220 may hold instructions corresponding to the communication applications. The memory device 220 may also store the contact database from which the contact records are provided.

The processor 210 may access the memory device 220 to execute instructions corresponding to the different communication applications. In an embodiment, the processor 210 executes instructions for providing the user-interface feature 245 on the display 230. While FIG. 2A shows one user-interface feature, numerous user-interface features may be implemented for providing different embodiments described herein. The user-interface 245 is just one example of one kind of user-interface feature that may be implemented on the communication system, according to an embodiment.

In an embodiment shown, the user-interface feature 245 displays information about communication events (transmitted and received communications). The processor 210 may execute instructions for monitoring and maintaining the user-interface feature 245 (shown as a list) updated, after communication events that are recorded in the user-interface feature 245. In one embodiment, when a communication event is detected that can be identified are associated with one of the contact records stored in the memory device 220, the entry is made in the user-interface feature that identifies the contact record, not just the communication identifier used with the event. Thus, the user-interface feature 245 may display only identifiers to contact records, at least to the extent that communication identifiers used in communication events are contained in the contact records stored on the device.

The communication device 200 may include one or more sets of input mechanisms 240, corresponding to hardware components that enable the user to enter input when interacting with the user-interface feature. Specific examples of input mechanisms 240 include buttons, contact-sensitive displays, dials, scroll-wheels, keys, multi-dimensional input devices, and microphones (for receiving voice commands)

The user may operate the input mechanisms 240 in order to enter, for example, record selection 124 (see FIG. 1), resulting in one of the entries of the list provided with user-interface feature 245 being selected. In one implementation, display 230 provides a window 242 or display area where multiple communication identifiers (e-mail, mobile number, SMS, MMS) in the contact record selected by record selection 124 are displayed. The processor 210 may generate the window 242 on the display 230 dynamically, in response to the record selection 124. In one embodiment, window 242 displays multiple communication identifiers (or representative data structures) at one time.

In an embodiment shown by FIG. 2A, the user's selection input 128 may be made through one of the input mechanisms 240, in coordination with the displayed user-interface 245 and contents of window 242. For example, the user may operate the input mechanisms 240 to cause one of the communication identifiers in the window 242 to be selected.

One or more communication components 218 may enable the device 200 to transmit and receive communications of different types. Examples of communication components 218 include a cellular radio and receiver for transmitting and receiving data over cellular networks, a modem for connecting to the Internet, or a or a wireless (e.g., IEEE 802.11a/b/g (WI-FI) or BlueTooth) component for communicating over those respective mediums. An initiated communication by the user may subsequently be transmitted (either automatically or through further manual intervention) using the communication component 218 appropriate for the type of communication being transmitted.

While an embodiment shown by FIG. 2A pertains to a device, an alternative embodiment may implement the components shown in FIG. 2A as an interconnected system. For example, one of the memory devices 220 may be a network memory, such as a contact database belonging to a user's Internet email account. The processor 210 may access the contact database over the Internet.

Likewise, an embodiment provides that programs or functionality described with processor 210 may be implemented from a network, that communicates with a client or end user device over the Internet. For example, user-interface 245 may be provided on a terminal in the form of a web-page, using programming that runs on a server. In fact, communications generated from the terminal may be uploaded to the server and transmitted as a communication type using programming that runs on the server. Numerous other combinations where components or functionality described by FIG. 2A are provided through network resources are possible.

Figure 2B:
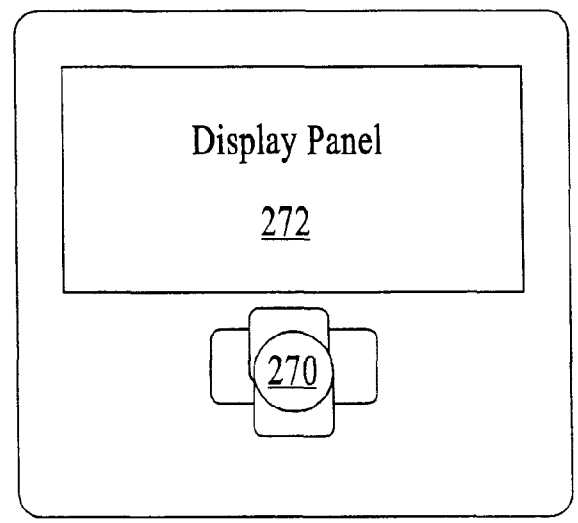
FIG. 2B illustrates a communication device for use with one or more embodiments of the invention.

FIG. 2B illustrates a communication device 260 for use with one or more embodiments of the invention. The communication device 260 is a wireless mobile computing device, capable of making and receiving phone calls and messages over cellular networks. In an embodiment, input mechanisms (such as described as element 230 in FIG. 2A) include a multi-dimensional component 270, positioned near a display panel 272. In one implementation, multi-dimensional component 270 has five dimensions, including four directional/navigational inputs and one selection motion (inward in center). The multi-dimensional component 270 positioned adjacent to display panel 272 enables the user to view the user-interface 245, and to enter the record selection 124 (described in FIG. 1) and/or selection input 128 (described in FIG. 1) with one hand. The proximity of the display panel facilitates the user to coordinate the input, including navigation input to scroll amongst, for example, the many communication identifiers or entries in the window 245. For example, an embodiment such as shown enables the user to use one thumb to enter all the inputs needed to view information from the user-interface feature 245, and to make selections or enter input while viewing the user-interface feature 245. In addition to the component 270, devices may use additional buttons or keys, including keys in the context of a QWERTY layout.

Methodology

Numerous methods and techniques may be implemented to enable a user to automatically initiate anyone of a plurality of communication types through selection of a corresponding contact identifier.

Figure 3:
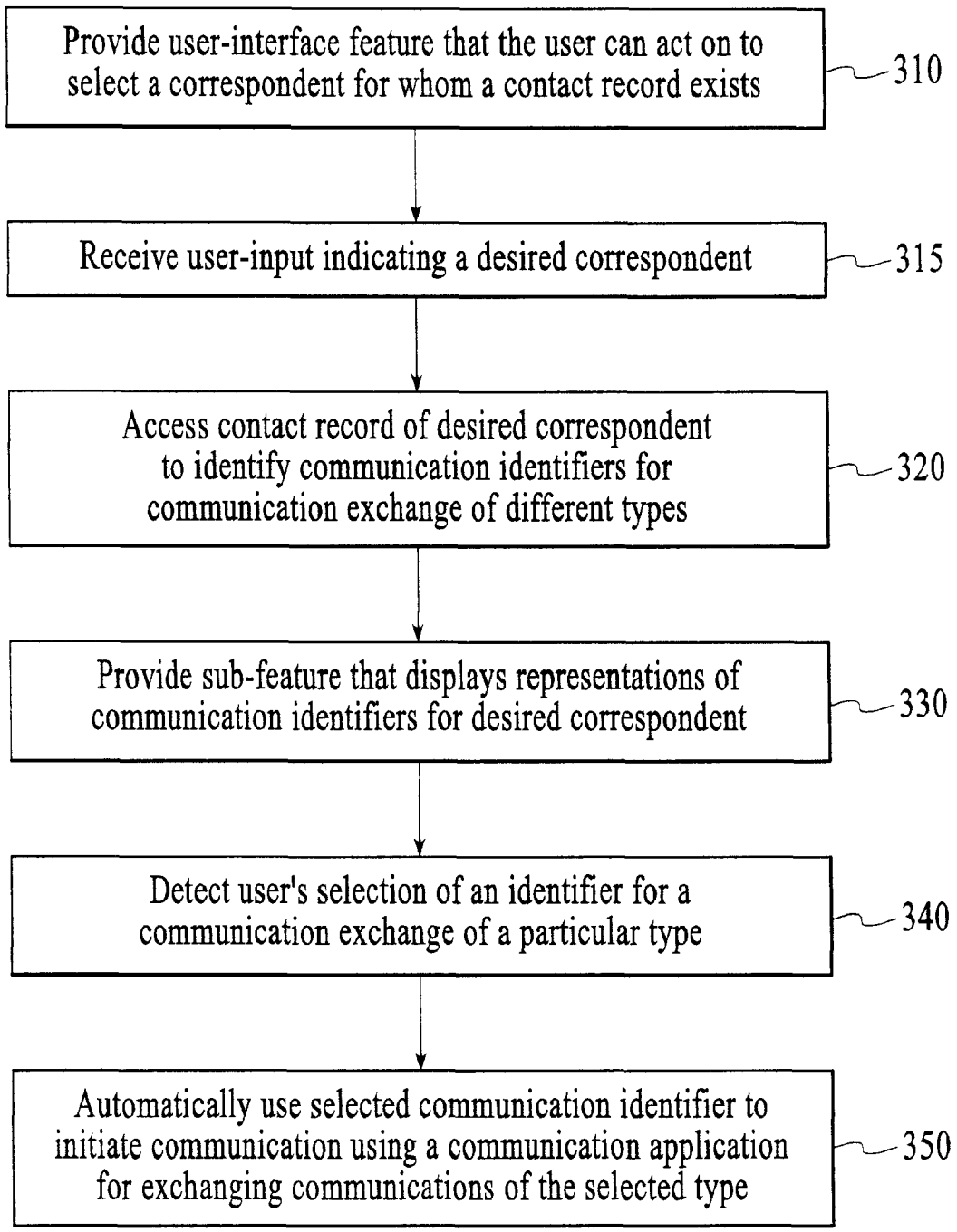
FIG. 3 describes a method for enabling information from a contact record to be displayed and used for initiating communications, under an embodiment of the invention.

In FIG. 3, a method is described for enabling information from a contact record to be displayed and used for initiating communications, under an embodiment of the invention. In Step 310, a user-interface feature is provided that the user can act on to communicate with a correspondent for whom a contact record exists. Different types of user-interface features may be provided, as described below.

According to one embodiment, the user-interface feature is a programmatic shortcut action that the user can trigger through mechanical interaction with the communication device. In such an embodiment, no information may be displayed in order to enable the user to trigger the action. Alternatively, the shortcut action may be graphical in nature, and reflect information (such as past communication activities) in order to enable selection of the contact record through information that is viewed. In one example, the user-interface feature may correspond to a list of favorite contacts, provided as an application or application feature of the communication device.

According to an embodiment, the user-interface feature displays information relating to past communication activities. For example, the user-interface feature may be in the form of a list having entries that are identifiable to a plurality of contact records stored on the communication device. Examples of such communication activities include a call log, a short phone list, and a message list (such as an inbox or outbox for email, SMS or MMS). Another example of a user-interface feature that reflects a previous communication activity is a message that informs the user of a missed call. Still further, other examples include a speed dial list or presentation. In the examples provided, individual entries in the list may identify a contact record of a correspondent for whom there has been a communication exchange, and the entries themselves are selectable or otherwise actionable by the user display additional information from the contact record.

In step 315, input is received from the user through the user-interface feature. The input indicates a desired correspondent. For example, the user may perform a shortcut action, or select an entry from a list pertaining to past communication activities. Alternatively, the user may open a notification relating to a contact record.

In step 320, a contact record for the desired correspondent may be accessed for information. The information may include multiple communication identifiers of the desired correspondent. For example, alternative phone number may be displayed from the contents of the contact record. Alternatively, a combination of phone numbers, email addresses and instant message identifiers may be displayed, so that the user can choose a type of communication.

In one embodiment, the contact record may reside in a contact database used by one or more applications, including, for example, an address book application. In another embodiment, the contact record of the desired correspondent may be created and stored in connection with another database or record collection for use with the user-interface features.

According to an embodiment, in step 330, a sub-feature is provided that displays information identified in step 320. The sub-feature enables interaction by the user of items displayed in the sub-feature. For example, items displayed in the sub-feature may be selectable through mechanical interaction with the communication device. In one embodiment, the sub-feature corresponds to a display area, such as window or box, in which multiple entries are provided. Each entry may display a communication identifier ("John@email.com") or a representation of the communication identifier ("John's email address"). Multiple communication identifiers may be represented at one time on a display area of the sub-feature. In the case where one communication identifier is capable of being used for different types of communications, multiple entries may represent communications of different types, even if they use the same identifier. In either case, an embodiment provides that the user is able to select more than one type of communication exchange with the desired correspondent, using display elements displayed at one time on the sub-feature.

According to an embodiment, the sub-feature is instantly presented in response to the user's input of step 315. Thus, if the user-interface feature is initially a list, and the input of step 315 selects an entry from the list, a window, box or other sub-feature may appear containing alternative phone numbers, or a combination of communication identifiers of different types. Accordingly, an embodiment provides that the sub-feature is dynamically generated. The sub-feature may disappear when not in use.

Furthermore, information displayed in the sub-feature may be configured based on information contained in the contact record of the desired correspondent. Thus, information appearing in the sub-feature is the result of information read from the contact record of the desired correspondent. The number of entries presented, and/or the type of communication identifiers presented may depend on what is contained in the contact record selected.

In step 340, a user's selection of a communication identifier provided in the sub-feature is detected. The user selection may be in various forms, depending on design and implementation. For example, the user-interface feature may be in the form of (i) the user clicking a mouse or pointer on the feature, (ii) the user tapping a contact-sensitive display at a region where the feature is displayed, (iii) the user entering text in a region provided by the feature, or (iv) the user moving a displayed cursor to hover, highlight or otherwise focus the object. Depending on the implementation, the communication identifier may correspond to, for example, a phone number (e.g. home phone number, work phone number, mobile or cellular number), e-mail address, and/or an identifier for instant messages.

Step 350 provides that the selected communication identifier is used to automatically perform one or more operations to initiate communication of a type indicated by the user's selection. If the selection is identified as a phone number for a mobile cellular device, a phone application may be used to initiate a phone call using the identified phone number. Thus, for example, the selection of the phone number may trigger the phone application to initiate the phone call by performing one of the following: (i) display the selected phone number and let the user manually select the phone number to be dialed, (ii) display and then automatically dial the selected number, or (iii) automatically dial the selected number. Likewise, if the selection is identified as an e-mail address, then an e-mail message may be initiated. For example, selection of the e-mail address may cause the e-mail application to automatically open a new message with the recipient address field (e.g. the "to" field) filled in with the selected e-mail address.

A method such as described by FIG. 3 provides that multiple types of communications may be initiated from a single interface, through the user's act of selecting a feature that displays the contact identifier. For example, a mobile phone number may be displayed as both a phone number and an SMS identifier. The user may make a selection of the phone number for the SMS identifier, in which case, the SMS application is used to address the SMS message. In the example provided, the user needs only to type the message.

The user-interface may be provided in various forms, as described below. An embodiment provides that more than one communication mechanism and/or application may be accessible to the user when the information is displayed.

Various applications and uses are possible in implementing embodiments of the invention. The following represent different usage scenarios, according to embodiments of the invention.

List Management

Communication applications often employ lists that reflect past communication activities. For example, one type of list typically maintained on some smart phones is a call log, which records every phone call made or received on the device. Another list that is sometimes maintained on smart phones is a redial list, showing most recently used numbers on a quick, easy to view list.

Figure 4A:
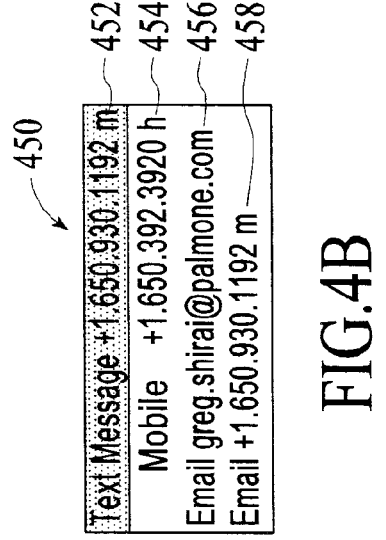
FIG. 4A and FIG. 4B illustrate embodiments implemented in the context of a list that is maintained for use with a phone application.
Figure 4B:
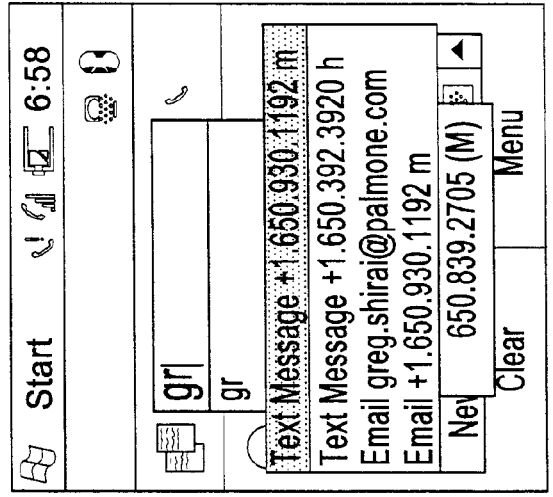

FIG. 4A and FIG. 4B illustrate embodiments implemented in the context of a list that is maintained for use with a phone application. A list such as shown in FIG. 4A and FIG. 4B may be displayed in response to an event, such as a user-selection. In FIG. 4A, the list 410 is an example of a user-interface feature that reflects recently received or dialed calls (e.g. the "redial list"). The list 410 includes a plurality of entries 420, corresponding to each received or made call. The plurality of entries 420 may include recognized entries 422 (alternatively referred to as "contact entries") or unrecognized entries 424. If an incoming phone call or an outgoing phone call uses a phone number contained in a stored contact record, the contact record is identified as the entry, thus making the entry recognized. Otherwise, the phone number is listed in the entry in an unrecognized form. Recognized entries may be displayed in the form of an identifier of the contact record containing the used phone number. For example, each recognized entry 422 may list the name of the contact for whom the contact record was made.

According to an embodiment, if the user selects a recognized entry 422, a window 430 is generated that lists information from the contact record identified by that entry. The window 430 is an example of a sub-feature. Within the window 430, information associated with the contact record of the selected entry is displayed. The information displayed may include a listing of communication identifiers, such as phone numbers, listed by fields or communication type. In one embodiment, the information displayed from the contact record includes the known or alternative phone numbers for that contact. In another embodiment, identifiers may be listed for conducting different types of communications, such as for email or text messaging.

In an embodiment shown by FIG. 4A, a list of known phone numbers 434 are provided in the window 430. Phone numbers 434 may be alternative phone numbers, select phone numbers (e.g. the first three phone numbers of a contact record) or all of the phone numbers for the contact. A subsequent selection of one of the phone numbers 434 causes that phone number to be dialed. In an implementation shown, phone numbers 434 are accompanied field indicators 438, reflecting the fields of the contact record for which the phone number is a value. In an alternative implementation, entries in the window 430 may represent the phone numbers or other communication identifiers, but the exact number or field value may be omitted. For example, the top entry in the window 430 may be replaced by "Greg's mobile".

In an embodiment, the communication application that manages or provides the list 410 reflects the type of communication identifiers that are displayed from the list. In a case of a redial list, such as shown by FIG. 4A, the window 430 displays phone numbers, as the redial list is used with the phone application.

In an embodiment shown by FIG. 4B, however, an alternative window 450 may be provided to the user from the list 410. The window 450 may list communication identifiers for exchanging communications of more than one type. In the example provided, the window 450 may display separate items for mobile phone number 452, instant text messages 454, and email addresses 456, 458. Some of the identifiers for different items may actually be the same, but fields listing the identifiers may designate the identifier for the corresponding communication type.

In an embodiment shown by FIG. 4B, the user may be able to specify an alternative communication identifier, and/or an alternative communication application for communicating with the correspondent of the contact record. For example, window 450 may display an email address, and the user may select the email address to automatically launch the email application. An email may be composed with the selected email address. As another example, the mobile number may be listed and used for email or SMS, rather than for a phone call.

In another embodiment, the windows 430 or 450 may display more information about the contact of the selected entry. For example, if the contact record corresponding to the selected entry includes an image, a representation of that image may be displayed in the window 430, or in another sub-feature that can be generated through the user's interaction with the list 410. Additionally, personal information, such as text accompanying the associated contact record may also be displayed in the window 430. In another embodiment, window 430 may include a link that is selectable by the user to view the entire contact record.

As mentioned, the windows 430 and 450 are just examples of a sub-feature that can be generated in response to an input from the user. Window 430 may float over other content, have different sizes, and/or be configurable by the user. According to an embodiment, information displayed in the window 430 is based on information stored in the contact record of the selected entry. Thus, the contents of the window 430 are determined by the contents of the contact record for the selected entry. Additionally, the size of the window, and the number of entries contained in the window, may be based on the contents of the corresponding contact record.

An embodiment such as shown by FIG. 4A or FIG. 4B enables the user to view the numbers (or other communication identifiers) before selecting an action that results in initiation of a communication. For example, the user may view the communication identifiers presented in window 430 and decide not to place a phone call. By presenting information based on the communication identifiers (e.g. phone numbers) of the selected contact record at the same time, the user is enabled to make a determination of how to communicate with the user (e.g. what number to use). For example, the user may view the area code of one of the numbers and recognize the number as being a long-distance call that is more expensive. As another example, by presenting the numbers for viewing before dialing, the user may recognize the number most often used by the contact, or view the information to determine that the user has no home number, so that the work number should be used.

As shown by FIG. 4A, an embodiment provides that the user may, from a presented user-interface such as list 410, make one selection to view phone numbers and other communication identifiers from a given contact record. In making the selection, the acts performed by the user may include navigating up or down, and then selecting. The selection action results in the window 430. One other selection action is needed for the user to place a call or initiate another communication. Thus, an embodiment provides that from list 410, the user needs only to make two selections: entry selection, then phone number/communication identifier selection. A communication is initiated based on the two selection acts of the user. This greatly simplifies the interaction required by the user, particularly in the context of small form-factor computing devices. The act of selecting may correspond to a button press or screen tap. In an embodiment such as shown by FIG. 2B, the user can make the selection action using the multi-dimensional input mechanism, with one hand and even one thumb.

Additionally, the user can view the phone number/communication identifier before committing to initiating the communication. Another embodiment may provide that more of the contact record may be viewed from selection from list 410, prior to the user indicating a type or desire to initiate the communication. For example, the user can decide to use the mobile number after viewing all of the phone numbers (as shown in FIG. 4A). In FIG. 4B, the user is not committed to a particular type of communication until viewing the phone number, email address, instant message identifier or other identifier for other types of communications. If additional communication identifiers of different types are used, the user can decide on the type of communication after viewing all of the different communication identifiers.

While embodiments such as described with FIGS. 4A and 4B illustrate a list that can be maintained with a phone application, numerous other types of lists may be maintained. For example, messaging applications typically keep lists of transmitted messages and received messages. Conventional techniques provide that such messages are listed individually, by subject or other message identifier. According to an embodiment, each entry in a message list that uses a recognized message identifier (e.g. email address from a known contact record) may be identified by an identifier to the contact record that has that message identifier. Moreover, the user may perform a selection action on the entry in the message list to view information from the contact record. The additional information that can be displayed may include additional communication identifiers, such as phone numbers or other message identifiers. Under an embodiment, for example, the user can select a message identifier from a sub-feature of the message list in order to compose a new message to the contact. For example, if the message list is an inbox, the user may select the entry that is displayed as a contact record, and even select the same email address for the contact that was used in transmitting the message. This allows the user to quickly compose a message to the contact that is not a "reply" to an existing message in the message list.

In another embodiment, the user can select another communication identifier from a message list, including one for enabling the user to initiate a different type of communication. For example, from the message list, the user may select an identifier of a contact record, causing a window (such as shown in FIG. 4A and FIG. 4B) to be displayed with phone numbers and messaging addresses from that contact record. In FIG. 4A, the user may initiate a phone call by selecting one of the phone number. Thus, the phone application may be launched from viewing the message list. In FIG. 4B, the user may initiate a communication of a particular type by selecting the particular communication identifier.

While embodiments described above provide for lists to be maintained in association with communication applications, an embodiment may also provide for applications that are themselves managers of communication activities. For example, a communication log may exist as an independent application, or part of an application that is independent of other communication applications. The communication log may provide a programmatic means by which communications made or received from the communication device are logged or otherwise recorded. The recording may be in the form of a list that maintains identifiers of contact records to indicate the occurrence of a communication, which may be of different types. As described with FIG. 4A or FIG. 4B, selection of an entry that is recognized (and thus listed as a contact record) results in information from a corresponding contact record.

Contact Look-Up

Contact lookup is a feature that can be used in association with a contact or address book application. The contact lookup feature is used, in for example, the TREO 650, manufactured by PALM, INC. The contact lookup feature enables a user to type in a sequence of alphanumeric characters. After the entry of each character in the sequence, all of the contact records that match that sequence at that state are identified. As the number of characters in the sequence grows, the number of matching contact records becomes fewer, until only one contact record is identified and unambiguous.

Different algorithms exist for performing the contact lookup operations. For example, a sequence of characters entered by the user may be matched to last name, or a last name or first name. Alternatively, the sequence of characters may be separated, with one portion of the sequence being matched to a first name and another portion being matched to a last name. Still further, the contact lookup feature may match a user's entry to a field other than the name of the contact.

Figure 5A:
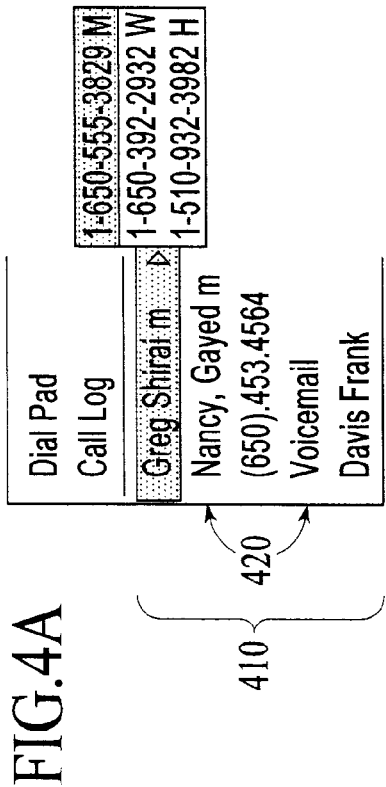
FIGS. 5A and 5B illustrate implementations of embodiments in connection with a lookup feature for a contact database.

With each entry in the user's entered sequence, a search is performed to match the sequence, or portions of it, to individual contact records. In one implementation, matching contact records are displayed to the user on an ongoing basis, responsive to each individual entry of the user. As such, the case often arises where more than one contact record matches an entry or sequence of entries, until at least another entry is made. When more than one entry matches the lookup sequence, the result is termed ambiguous. FIG. 5A illustrates implementation of an embodiment in connection with a lookup feature 510 for a contact database, where results matching the user's entries are in an ambiguous state. In an embodiment, the results of a contact lookup operation are presented to the user in a window 530. Information from multiple contact records that match the user's entry 532 are displayed in the window 530. According to an embodiment shown, the information from each contact record includes a set of communication identifiers. FIG. 5A shows an embodiment similar to FIG. 4A, in that the set of communication identifiers for each record are phone numbers 542, 544. Each of the phone numbers listed are provided as active items, meaning the user can select (e.g. through clicking, button press or screen tap) or act on the numbers to cause the phone numbers to be used by the phone application. For example, the user may select one of the phone numbers for one of the two records to trigger the communication device to initiate a phone call.

Figure 5B:
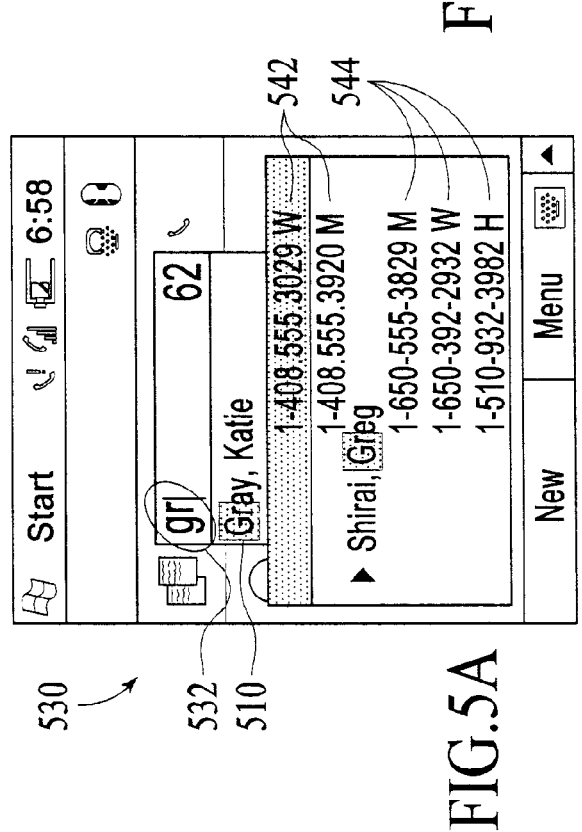

In the case where the number of matching records is limited, but more than one, an implementation provides that the window 530 may extend, or be scrollable to view all the matching records. FIG. 5B illustrates a window 550 with an unambiguous result, with the variation that more than one type of communication identifier is displayed in the window.

Device Notifications Involving Contacts

Notifications provide another context for implementing a user-interface feature that displays information from a contact record, under an embodiment of the invention. Generally, notifications are messages that are programmatically generated for the user of a device in response to an event. The following are examples of how notifications may be used: (i) to inform a user of a missed phone call; (ii) to inform the user that there is voicemail; (iii) to mark the arrival of an incoming message; (iv) to display a calendar event or reminder; and (v) to display a deadline for a scheduled task.

According to an embodiment, one or more types of notifications may be used that involve contacts. In such cases, an embodiment provides that the notification may be present a contact record pertinent to the notification in a manner that enables the user to view, or select to view, information from the record.

Figure 6A:
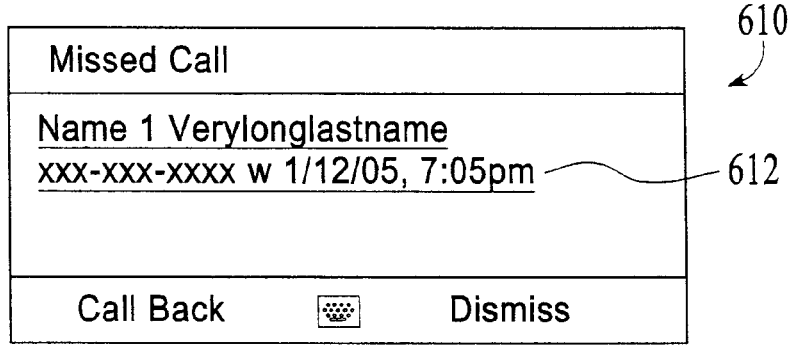
FIG. 6A-6C illustrate the use of embodiments of the invention in the context of notifications.

FIG. 6A shows a notification 610 for a missed call. The number of the caller is displayed. When the call is received, the number is matched to a number from a contact record in the device's contact database. An entry 612 indicates the name of the caller, which may reflect the name from either the contact record or from the caller-identification. The notification 610 presents the entry 612 as a link or other selectable data structure. The link may be acted on by the user to view the contact record for the caller, or to view information from the contact record, such as presented by windows 530 and 550 of FIGS. 5A and 5B. The information that can be viewed from the contact record may include call back number, alternative phone number, email address, SMS address, MMS address, and/or other communication identifiers.

Figure 6B:
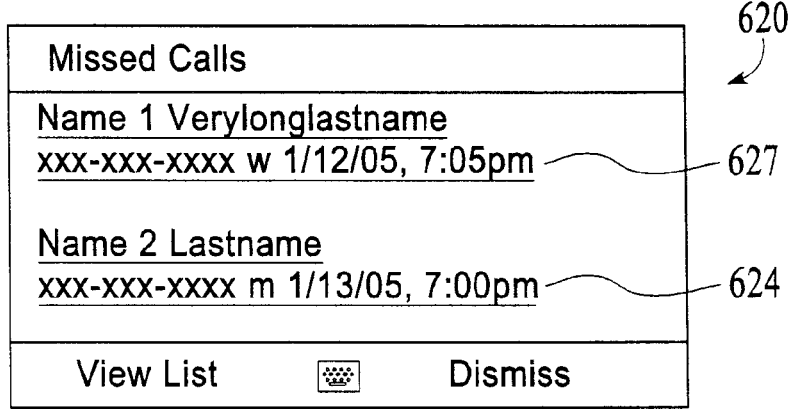

FIG. 6B illustrates a notification 620 that shows two missed calls as separate entries 622, 624. In the example shown, each call contained information (e.g. phone number) that enabled the communication device to identify a contact record that belongs to the caller. Each entry 622, 624 identifies the contact record of the caller, and is in the form of a link or selectable data structure that can be acted upon to view the contact record, or information from the contact record.

Figure 6C:
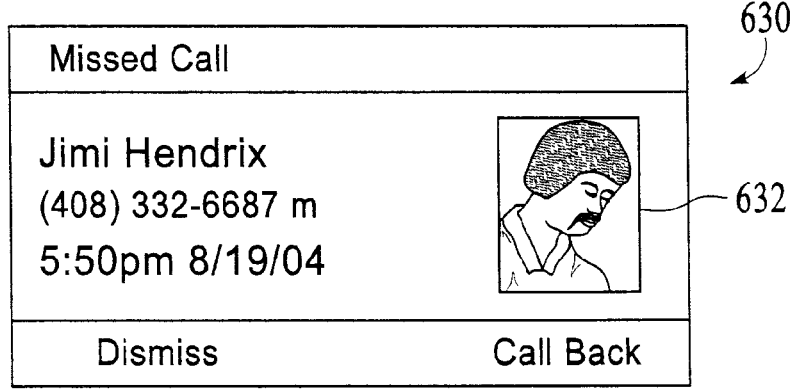

FIG. 6C shows an example where a notification 630 displays information from the contact record, without further action required from the user. In an embodiment, the information includes an image 632 stored in or with the contact record. Thus, the user can tell who called with a quick glance, rather than reading text, or selecting links to contact records.

Shortcut Actions

One or more embodiments may be implemented for shortcut actions. Shortcut actions are user-interface features that simply the use of computing devices. An example of a shortcut action that can be implemented with an embodiment is a press and hold of an input key. Another example of a shortcut action is the user selecting an icon or display object that represents a longer operation. Still further, other examples of shortcut actions include (i) a glyph entered by the user on a writing tablet or context-sensitive display, or (ii) a voice utterance that can be translated by a speech interface. Cellular phones, for example, sometimes employ shortcut actions as speed dials, to enable a person to make a phone call through a tap and hold of a button, a selection of a displayed object, or a known speech utterance. Numerous other examples of shortcut actions exist.

Figure 7:
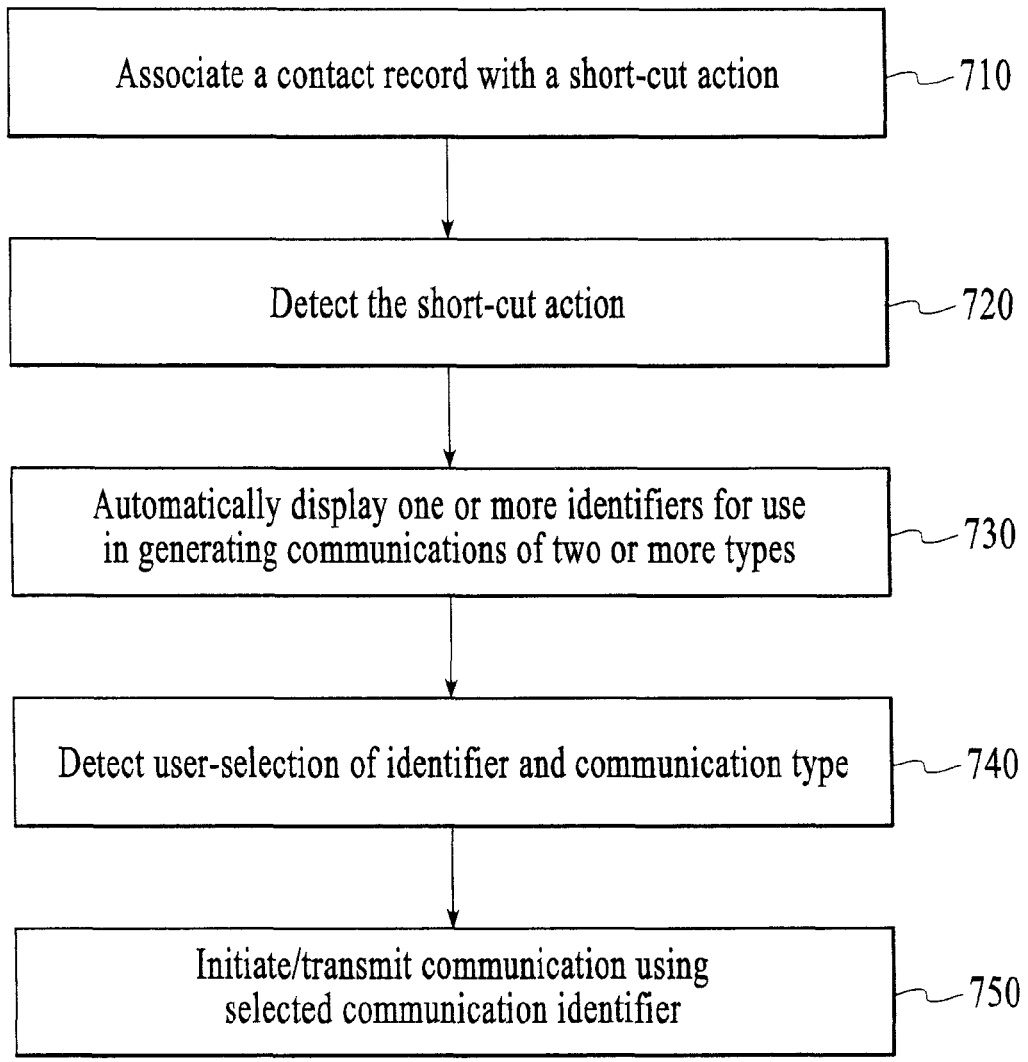
FIG. 7 illustrates a method in which a user interface feature such as described in FIG. 1 corresponds to a shortcut action.

FIG. 7 illustrates a method in which a user interface feature such as described in FIG. 1 corresponds to a shortcut action. A method such as described may be performed in order to (i) display information from a contact record, and (ii) to enable the user to initiate a communication to the contact of the record, using one of the communication identifiers provided in the contact record.

In step 710, a contact record is associated with a shortcut action. This association may be made by the user, through programmatic means, or set as a setting or default association with software or hardware on which an embodiment is implemented. For example, the user may associate a tap and hold of a QWERTY key with a contact in the device's contact database. As another example, the user may associate a displayed object, such as an icon, with the contact record.

Step 720 provides that the shortcut action is detected. In one implementation, the shortcut action may occur without a precursor user-interface (such as displaying a list).

Responsive to the shortcut action occurring, step 730 provides that one or more communication identifiers are automatically displayed or made available for display. In one embodiment, information from the contact record associated with the shortcut action is rendered for the user without further action. In another embodiment, the user is provided a link or other active data structure that the user can select from in order to view some or all of the information in the associated contact record.

In displaying the communication identifiers, the contact record associated with the action may be accessed responsively to the occurrence of the shortcut action. Thus, if the user programs the shortcut action to a contact record, then changes the contact record, the occurrence of the shortcut action will provide updated information.

Information displayed or made available in response to the shortcut action may include the communication identifiers of the contact record, or representations of those identifiers. In an implementation, only communication identifiers of a particular kind are displayed. For example, all phone numbers, are a primary and alternative phone number are displayed. In another implementation, communication identifiers for initiating different kinds of communications are displayed. For example, a phone number, email address, SMS and/or MMS identifier may be displayed or made viewable.

In an embodiment, the communication identifiers may be displayed as active data structures that can be selected or otherwise acted on to programmatically initiate a communication of a type indicated by the identifier, or by a field of the identifier. In step 740, the user selects one of the communication identifiers. In an embodiment in which the user can initiate different types of communications from the displayed communication identifiers, the user's selection may indicate the type of communication that is to be initiated. The indication may be provided by the nature of the communication identifier. For example, the presence of "@" may indicate an email communication, while a "1" plus an area code may indicate a phone number. In another embodiment, the communication identifier is stored with context in the contact database (e.g. "home phone number" or "email address"), and its display includes markings that indicate the context, and thus the use of the communication identifier for a particular kind of communication.

Step 750 provides a communication is placed, transmitted, or at least initiated, to a correspondent of the contact record using the selected contact identifier. In the case where the communication identifiers that are displayed are phone numbers, selection of one of the phone numbers causes that phone number to be dialed by the communication device. For email addresses, an embodiment provides that a new message is opened, and composed to the selected email address.

Image Content and Use

In making functionality of devices more contact-centric, there is also appeal in making the contact information more personable and identifiable. Image content is a feature that can be supported by many contact databases. Individual contact record may include pointers to images, so that the contact record may be viewed as an image when listed.

With regard to embodiments described above, information displayed from a contact record may include image data stored with the contact record that is being used. Thus, for example, an entry in the list 410 (FIG. 4) may render an image associated with the contact in within or with the window 430. FIG. 6C illustrates another implementation of the user of image data.

An embodiment such as described with FIG. 7 may provide that a short cut action is the selection of a display object, such as an icon. In an embodiment, the selection may correspond to an image provided from a contact database. The image may be a thumbnail or other rendition of an actual image stored on the device.

Figure 8:
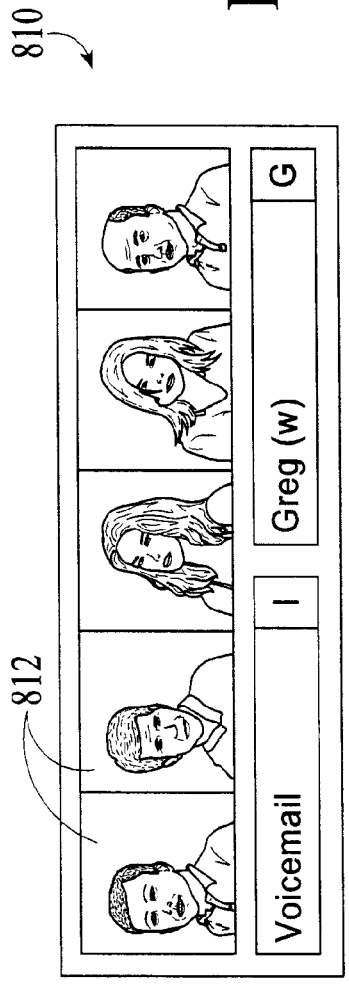
FIG. 8 illustrates an embodiment of a user-interface incorporating image data in connection with a shortcut action, such as described with FIG. 7.

FIG. 8 illustrates an embodiment in which a user-interface 810 is provided comprising a plurality of thumbnail images 812. In one embodiment, the user-interface 810 is part of a speed dial application. Each image represents a number of a contact, and selection of one of the image causes the communication device to dial a designated number in the contact record of that contact.

As an alternative, an embodiment provides that selection of one of the images 812 causes information from the associated contact record to be displayed or made viewable. For example, selection of one of the images may cause a subfeature, such as shown and described by FIG. 4A, FIG. 4B, FIG. 5A, or FIG. 5B to be generated (e.g. see window 430). In each case, communication identifiers, such as phone numbers and email addresses may be displayed. One or more subsequent user-actions may be required to select a desired communication identifier and to initiate a communication.

While an embodiment such as described above provides that selection of an image causes a number to be dialed, another embodiment may provide that another type of communication to be initiated. For example, selection of one of the images 812 may initiate an email, SMS or MMS to contact associated with the image, using an identifier stored in the associated contact record. The communication may be initiated automatically in response to the image selection, or after the user has been presented with communication identifiers from the contact record associated with the image, and then made a subsequent selection.

Figure 9:
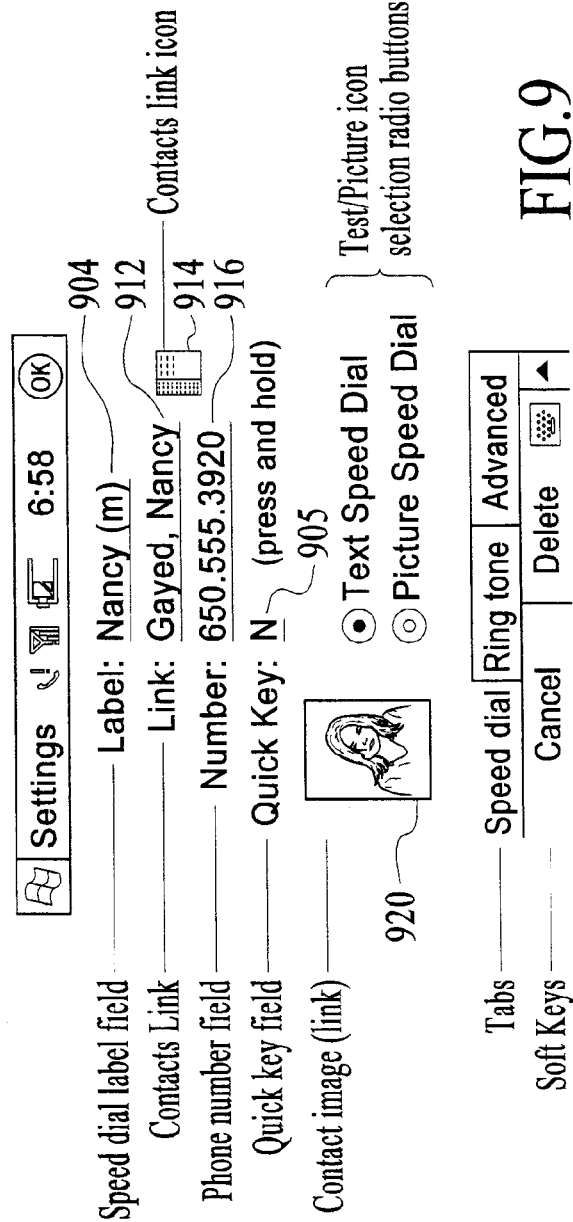
FIG. 9 illustrates an interface for establishing a speed dial action in connection with image data from a contact record, under an embodiment of the invention.

FIG. 9 illustrates an interface 910 for establishing a speed dial action, under an embodiment of the invention. In FIG. 9, the user may assign a shortcut action 905 ("press and hold") to a contact record by designating the action in an action designation field 902 of the interface 910. The user may designate the label 904 for the shortcut action to the contact. The interface 910 provides a link 912 to the contact record of the contact. In one implementation, the link 912 may be established by the user manually, using a contact lookup feature 914. Alternatively, the link may be established by the user entering a value for the number field 916. The number provided may be programmatically matched to one of the contact records stored on the device. The number field 916 may provide the number that is dialed when the shortcut action 905 is performed. If the identified contact record includes or is associated with an image, a thumbnail 920 or other rendition (even duplicate) of that image is provided in the interface 910.

In one embodiment, linking the contact record to the shortcut action results in the shortcut action being updated with the contact record. For example, the user can alter the numbers of the contact record, and the number field 916 is automatically changed. Performance of the shortcut action 905 results in the updated number being used, as reflected by the contact record. Thus, an embodiment such as described in FIG. 9 enables the user to manage speed dial settings by managing the contact database, simplifying the user's management of the device.

When interface 910 is closed, an embodiment provides the shortcut action may be triggered in one of two ways. The user may perform shortcut action 905 (press and hold the "n" key) or the user may select an iconic representation of shortcut action/interface. In one implementation, the iconic representation may correspond to image 920.

While FIG. 9 provides that the shortcut action 905 dials the number 916, another embodiment provides that the shortcut action 905 initiates another type of communication, as specified in a corresponding field. Furthermore, more than one shortcut action may be assigned to a contact. For example, two phone numbers, or a phone number and an email address may be assigned to initiate communication using the respective identifiers.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for operating a computing device, the method being performed by one or more processors of the computing device and comprising:
    presenting a user interface feature on a touch-sensitive display of the computing device, the user interface feature including one or more images and one or more names of persons associated with the one or more images, each of the one or more images being (i) associated with a person and contact information for that person, and (ii) selectable by a user;
    enabling the user to select a first image from the one or more images by making contact with a region on the touch-sensitive display where the first image is present;
    in response to the user selecting the first image, presenting contact information corresponding to the person associated with the first image on the display, the contact information including one or more selectable contact entries; and
    in response to the user selecting one of the one or more selectable contact entries, automatically initiating a communication using an application corresponding to a type of the selected contact entry.

2. The method of claim 1, wherein the one or more selectable contact entries include a representation corresponding to a type of a contact identifier.

3. The method of claim 1, wherein the one or more selectable contact entries include a contact identifier, the contact identifier including at least one of a phone number, an email address, or an instant message identifier.

4. The method of claim 1, wherein the application includes at least one of a phone application, an email application, or a messaging application.

5. The method of claim 1, wherein the user interface feature corresponds to a list of favorite contacts.

6. The method of claim 1, wherein the computing device is a cellular phone.

7. A non-transitory computer readable medium storing instructions that, when executed by one or more processors of a computing device, cause the one or more processors to perform a method comprising:
    presenting a user interface feature on a touch-sensitive display of the computing device, the user interface feature including one or more images and one or more names of persons associated with the one or more images, each of the one or more images being (i) associated with a person and contact information for that person, and (ii) selectable by a user;
    enabling a user to select a first image from the one or more images by making contact with a region on the touch-sensitive display where the first image is present;
    in response to the user selecting the first image, presenting contact information corresponding to the person associated with the first image on the display, the contact information including one or more selectable contact entries; and
    in response to the user selecting one of the one or more selectable contact entries, automatically initiating a communication using an application corresponding to a type of the selected contact entry.

8. The non-transitory computer readable medium of claim 7, wherein the one or more selectable contact entries include a representation corresponding to a type of a contact identifier.

9. The non-transitory computer readable medium of claim 7, wherein the one or more selectable contact entries include a contact identifier, the contact identifier including at least one of a phone number, an email address, or an instant message identifier.

10. The non-transitory computer readable medium of claim 7, wherein the application includes at least one of a phone application, an email application, or a messaging application.

11. A computing device comprising:
    a touch-sensitive display;
    one or more processors coupled to the touch-sensitive display; and
    a memory resource coupled to the one or more processors, the memory resource storing instructions that, when executed by the one or more processors, cause the one or more processors to:
        present a user interface feature on the touch-sensitive display, the user interface feature including one or more images and one or more names of persons associated with the one or more images, each of the one or more images being (i) associated with a person and contact information for that person, and (ii) selectable by a user;

enabling a user to select a first image from the one or more images by making contact with a region on the touch-sensitive display where the first image is present;

in response to the user selecting the first image, present contact information corresponding to the person associated with the first image on the display, the contact information including one or more selectable contact entries; and in response to the user selecting one of the one or more selectable contact entries, automatically initiate a communication using an application corresponding to a type of the selected contact entry.

12. The computing device of claim 11, wherein the one or more selectable contact entries include a representation corresponding to a type of a contact identifier.

13. The computing device of claim 11, wherein the one or more selectable contact entries include a contact identifier, the contact identifier including at least one of a phone number, an email address, or an instant message identifier.

14. The computing device of claim 11, wherein the application includes at least one of a phone application, an email application, or a messaging application.

15. The computing device of claim 11, the user interface feature corresponds to a list of favorite contacts.

* * * * *